US011709797B2

(12) United States Patent
Liu et al.

(10) Patent No.: US 11,709,797 B2
(45) Date of Patent: Jul. 25, 2023

(54) METHOD, DEVICE AND COMPUTER PROGRAM PRODUCT FOR INFORMATION PROCESSING

(71) Applicant: EMC IP Holding Company LLC, Hopkinton, MA (US)

(72) Inventors: Cherami Liu, Shanghai (CN); Ming Zhang, Shanghai (CN); Kun Wang, Beijing (CN); Pengfei Wu, Shanghai (CN); Jinpeng Liu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 451 days.

(21) Appl. No.: 16/669,313

(22) Filed: Oct. 30, 2019

(65) Prior Publication Data

US 2020/0409906 A1 Dec. 31, 2020

(30) Foreign Application Priority Data

Jun. 28, 2019 (CN) .......................... 201910575426.2

(51) Int. Cl.
*G06F 16/00* (2019.01)
*G06F 16/13* (2019.01)
*G06F 16/14* (2019.01)
*H04L 9/06* (2006.01)
*G06F 21/62* (2013.01)

(52) U.S. Cl.
CPC ............ *G06F 16/137* (2019.01); *G06F 16/14* (2019.01); *G06F 21/6245* (2013.01); *H04L 9/0637* (2013.01); *H04L 9/0643* (2013.01)

(58) Field of Classification Search
None
See application file for complete search history.

(56) References Cited

U.S. PATENT DOCUMENTS

| 8,244,831 | B1 * | 8/2012 | McLennan | G06F 16/27 709/200 |
| 8,761,512 | B1 * | 6/2014 | Buddemeier | G06F 18/24323 382/181 |
| 9,667,720 | B1 * | 5/2017 | Bent | G06F 16/22 |
| 9,811,546 | B1 * | 11/2017 | Bent | G06F 16/2228 |
| 10,180,912 | B1 * | 1/2019 | Franklin | G06F 21/6245 |
| 10,417,219 | B1 * | 9/2019 | Yang | H04L 9/0643 |
| 10,567,320 | B2 * | 2/2020 | Chalakudi | H04L 51/23 |
| 10,762,060 | B1 * | 9/2020 | Faulkner | G06F 7/14 |

(Continued)

*Primary Examiner* — Hasanul Mobin
(74) *Attorney, Agent, or Firm* — Womble Bond Dickinson (US) LLP

(57) ABSTRACT

According to embodiments of the present disclosure, a method, device and computer program product for information processing are proposed. The method comprises: obtaining identification information of a shard of metadata at a first node of a blockchain-based metadata management system; determining, based on similarities of the identification information of the shard and identification information of candidate nodes of the metadata management system, a second node for positioning the shard from the candidate nodes; and enabling the second node to process the identification information of the shard, to manage storage of the shard in the metadata management system. Therefore, the present solution can improve efficiency, security and robustness of the metadata management system.

20 Claims, 8 Drawing Sheets

(56) References Cited

U.S. PATENT DOCUMENTS

| | | | |
|---|---|---|---|
| 2013/0290249 A1* | 10/2013 | Merriman | G06F 16/278 |
| | | | 707/610 |
| 2017/0012813 A1* | 1/2017 | Skaaksrud | H04L 41/32 |
| 2020/0042635 A1* | 2/2020 | Douglass | H04L 9/3239 |
| 2020/0133780 A1* | 4/2020 | Zhang | H04L 67/1044 |
| 2020/0137154 A1* | 4/2020 | Wu | G06F 16/1834 |
| 2020/0153889 A1* | 5/2020 | Lee | H04L 67/10 |

* cited by examiner

METHOD, DEVICE AND COMPUTER PROGRAM PRODUCT FOR INFORMATION PROCESSING

CROSS-REFERENCE TO RELATED APPLICATION

This patent application claims priority, under 35 U.S.C. § 119, of Chinese Patent Application No. 201910575426.2, filed Jun. 28, 2019, entitled "METHOD, DEVICE AND COMPUTER PROGRAM PRODUCT FOR INFORMATION PROCESSING."

FIELD

Embodiments of the present disclosure generally relate to the field of information processing, and more specifically, to a method, device and computer program product for information processing.

BACKGROUND

In a multi-cloud environment, the indexing data are generally grouped into many indexes in a search cluster of data protection. An index can be split into many shards (i.e., partitions of indexing data), and each shard has a number of replicas. Shard information is the major metadata of the search cluster. The metadata management system is the core component of the search cluster. It is critical to keep tracks of the shards, more specifically, to find where the shards are stored in the distributed search node.

SUMMARY

Embodiments of the present disclosure provide a method, device and computer program product for information processing.

In a first aspect of the present disclosure, a method of information processing is provided. The method comprises: obtaining identification information of a shard of metadata at a first node of a blockchain-based metadata management system; determining, based on similarities of the identification information of the shard and identification information of candidate nodes of the metadata management system, a second node for positioning the shard from the candidate nodes; and enabling the second node to process the identification information of the shard, to manage storage of the shard in the metadata management system.

In a second aspect of the present disclosure, a device for information processing is provided. The device comprises at least one processing unit and at least one memory. The at least one memory is coupled to the at least one processing unit and stores instructions executed by the at least one processing unit. The instructions cause, when executed by the at least one processing unit, the device to perform acts comprising: obtaining identification information of a shard of metadata at a first node of a blockchain-based metadata management system; determining, based on similarities of the identification information of the shard and identification information of candidate nodes of the metadata management system, a second node for positioning the shard from the candidate nodes; and enabling the second node to process the identification information of the shard, to manage storage of the shard in the metadata management system.

In a third aspect of the present disclosure, a computer program product is provided. The computer program product is tangibly stored on a non-transient computer readable medium and includes machine executable instructions which, when executed, cause a machine to execute steps of the method as described in accordance with the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent, through the following detailed description of the example embodiments of the present disclosure with reference to the accompanying drawings, in which the same reference symbols generally refer to the same elements.

Throughout the drawings, the same or similar reference symbols refer to the same or similar elements.

DETAILED DESCRIPTION OF EMBODIMENTS

Figure 1:
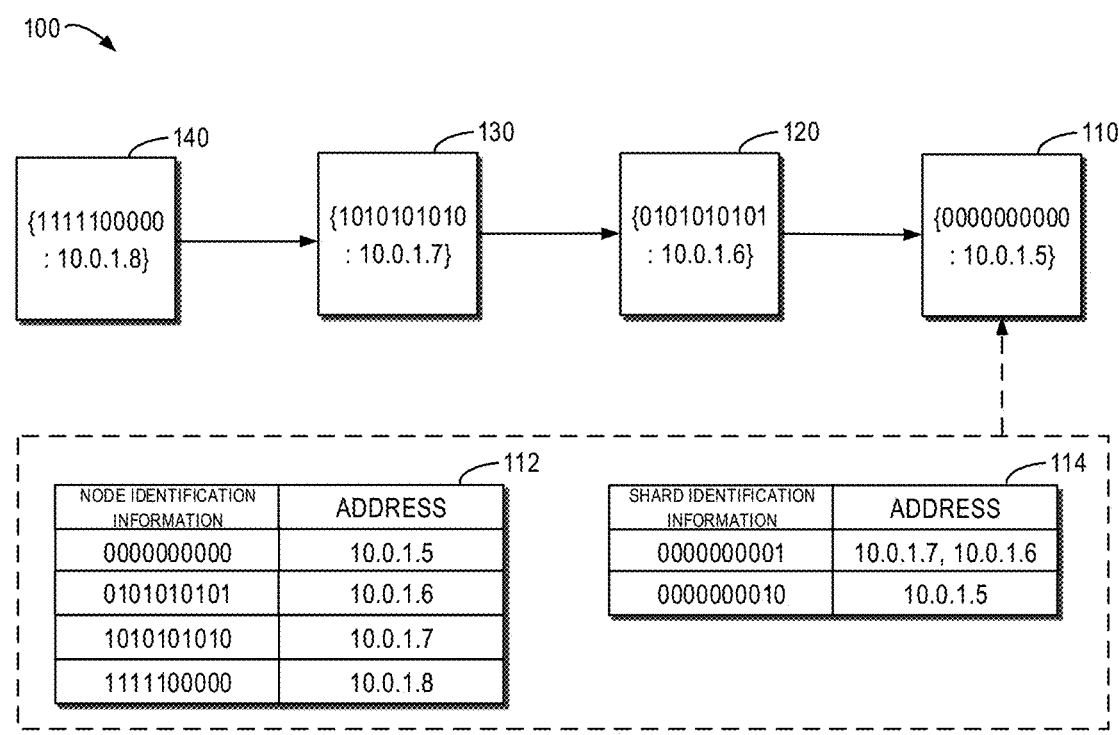
FIG. 1 is a schematic diagram illustrating an example of a metadata management system according to embodiments of the present disclosure.

Preferred embodiments of the present disclosure will now be described in detail with reference to the accompanying drawings. Although the drawings illustrate preferred embodiments of the present disclosure, it would be appreciated that the present disclosure may be implemented in various manners but cannot be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

Traditionally, a distributed hash table-based method is used to implement distributed management of shards in respective nodes of the metadata management system. However, the method contains deficiencies with respect to security, robustness and efficiency.

Specifically, in respect of security, the distributed hash table-based method is void of authentication function. Any nodes (including those nodes not controlled by the system administrator) can publish node descriptions and data status information to the system, making the system vulnerable to attacks. This is a critical issue in both private and public networks.

In respect of robustness, the method is not robust to network partition. The method does not guarantee that one record is to be found once it has been published. When network partition happens, certain records actually existing in the system may not be found.

In respect of efficiency, the method needs nodes to relay a shard and its replica retrieval message, which has the time complexity log(n). As a result, it is not efficient to find a shard and its replica in the system.

In order to at least partly solve the above problem and one or more of other potential problems, example embodiments of the present disclosure provide a solution for information processing. In the solution, respective nodes of a metadata management system may be maintained via a blockchain. Nodes can maintain respective blockchain databases. A record in the blockchain database may be a key-value pair, where the key may be identification information of a node (for example, hash identification information of a node), and the value may be an address of the node (for example, an IP address of the node). The node identified by the identification information may be connected using the address. The nodes can also maintain a shard address database. A record in the shard address database may also be a key-value pair, where the key may be identification information of a shard (for example, a hash digest of a shard), and the value may be an actual storage position of the shard (for example, an IP address of the node storing the shard).

Identification information of a shard and identification information of nodes may be of the same length (for example, 10 bits) so that the identification information of the shard and the identification information of nodes are comparable. In this way, identification information of nodes having the greatest similarity to the identification information of the shard may be determined, to determine nodes identified by the node identification information. Next, the identification information of the shard and the actual storage position of the shard are stored associatively in the shard address database of the identified node as a record, to support efficient determination of the actual storage position of the shard based on the identification information of the shard.

Since the identification information of the shard and the actual storage position of the shard are stored associatively as a record into the shard address database of a node, the records stored on the blockchain can be minimized, so that the size of the blockchain grows slowly and the changes of the blockchain are also minimized.

In addition, as compared to the legacy technology, the solution according to the present invention has advantages with respect to security, robustness and efficiency. In respect of security, the solution according to the present invention can support authentication in a blockchain-based metadata management system. For example, business logic code on the blockchain can enforce a node to register only one record, such as an IP address, on the blockchain. A node cannot register several IP addresses on the blockchain, and the record on the blockchain can only be unregistered by the node itself. This may be achieved with every registration request signed by the private key of the node. The request may be verify by a majority of nodes in the blockchain, based on the chosen consensus algorithm. Furthermore, a third party may be employed to issue a certificate with certain permission to each node, thereby implementing attribute-based access control on the blockchain.

In respect of robustness, as aforementioned, the distributed hash table-based solution is not robust to network partition, and there is no guarantee that a node registered on the distributed hash table will be found once network partition happens. In contrast, the blockchain-based solution of the present invention is more robust to network partition. If network partition happens after a new block containing a new registration record is accepted by the blockchain, the registered node can always be found as long as the node is reachable, since registration records of all nodes are already obtained locally. Of course, if network partition happens before a new block is accepted by the blockchain, a particular node will not be found by the peers which are not in the same partition of the network, since nodes cannot obtain the latest blocks on the blockchain. However, once different partitions of the network are reconnected, the particular node can be found.

In respect of efficiency, the solution of the present invention exhibits a better retrieval function. In the solution of the present invention, a given shard may be found in two hops, instead of log(n) hops. Specifically, an actual storage address of a shard is found, and then the shard is discovered based on the address. Therefore, the solution of the present invention is efficient with respect to retrieval performance.

Hereinafter, reference will be made to FIGS. 1 to 8 to describe in detail specific examples of the present solution. FIG. 1 is a schematic diagram illustrating an example of a metadata management system 100 according to embodiments of the present disclosure. The metadata management system 100 includes nodes 110-140 storing shards of metadata. As aforementioned, in the search cluster of data protection, the indexing data are typically grouped into many indexes. An index may be split into many shards (i.e., partitions of indexing data), and each shard may have a number of replicas. Shard information is major metadata of a search cluster.

The number of nodes is provided here merely as an example, and the metadata management system 100 may include any number of nodes. The node may include, but is not limited to, any physical device having a computing and storage capability, such as a cloud computing device, large-scale computer, server, personal computer, desktop computer, laptop computer, tablet computer, personal digital assistant, and the like, and any virtual device having a computing and storage function.

The node may has identification information (for example, hash identification information) and an address (for example, an IP address). For example, as shown in FIG. 1, the node 110 has identification information "0000000000" and an address "10.0.1.5". For the purpose of description, identification information of a node is shown with a length of 10 bits, which may be longer or shorter, for example 128 bits or 258 bits.

The node may include a blockchain database and a shard address database. For example, as shown in FIG. 1, the node 110 may include a blockchain database 112 and a shard address database 114. For clarity, only the blockchain database 112 and the shard address database 114 of the node 110 are shown in the drawings, and other nodes in the metadata management system 100 may include a respective blockchain database and a respective shard address database.

The blockchain database 112 may store associatively identification information and addresses of respective nodes in the metadata management system 100. For example, the identification information "0000000000" and the address "10.0.1.5" of the node 110 may be stored associatively in the blockchain database 112 as a record.

The shard address database 114 may store associatively identification information of shards and addresses of nodes storing the shards. Identification information of a shard may be acquired by performing hash for the shard. For example, as shown in FIG. 1, the identification information "0000000001" and the addresses "10.0.1.7" and "10.0.1.6" of the shard are stored associatively in the shard address database 114 as a record which indicates that the shard with identification information "0000000001" and its replica are stored at nodes of addresses "10.0.1.7" and "10.0.1.6". In some embodiments, records in the shard address database 114 may be organized in a tree structure.

Identification information of shards and identification information of nodes may be of the same length (for example, 10 bits), so that the identification information of shards and the identification of nodes are comparable. A record including identification information of a shard and addresses of nodes storing the shard may be stored at a node identified by the identification information of nodes having the greatest similarity to the identification information of the shard. For example, as shown in FIG. 1, the shard information "0000000001" and "0000000010" has the greatest similarity to the node identification information "0000000000". As such, the record containing the shard identification information "0000000001" and the addresses "10.0.1.7" and "10.0.1.6" of the nodes storing the shard, and the record containing the shard identification information "0000000010" and the address "10.0.1.5" of the node storing the shard are stored in the node 110 with node identification information "0000000000".

Therefore, a node may determine identification information of nodes with the greatest similarity to identification information of a shard, thereby determining nodes identified by the identification information of nodes, and may determine an address of a node actually storing the shard from the determined nodes, to efficiently determine the actual storage position of the shard based on the identification information of the shard.

Figure 2:
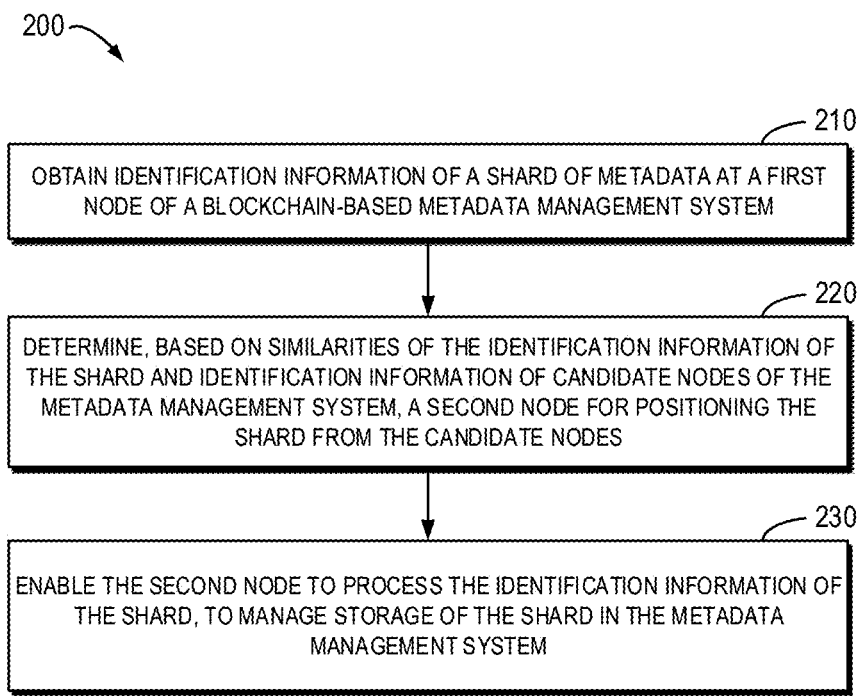
FIG. 2 is a flowchart of a method of information processing according to embodiments of the present disclosure.

FIG. 2 is a flowchart of a method 200 of information processing according to embodiments of the present disclosure. For example, the method 200 may be performed by the nodes as shown in FIG. 1. It would be appreciated that the method 200 may include additional steps not shown and/or may skip the step(s) shown, and the scope of the present disclosure is not limited in the aspect.

Figure 3:
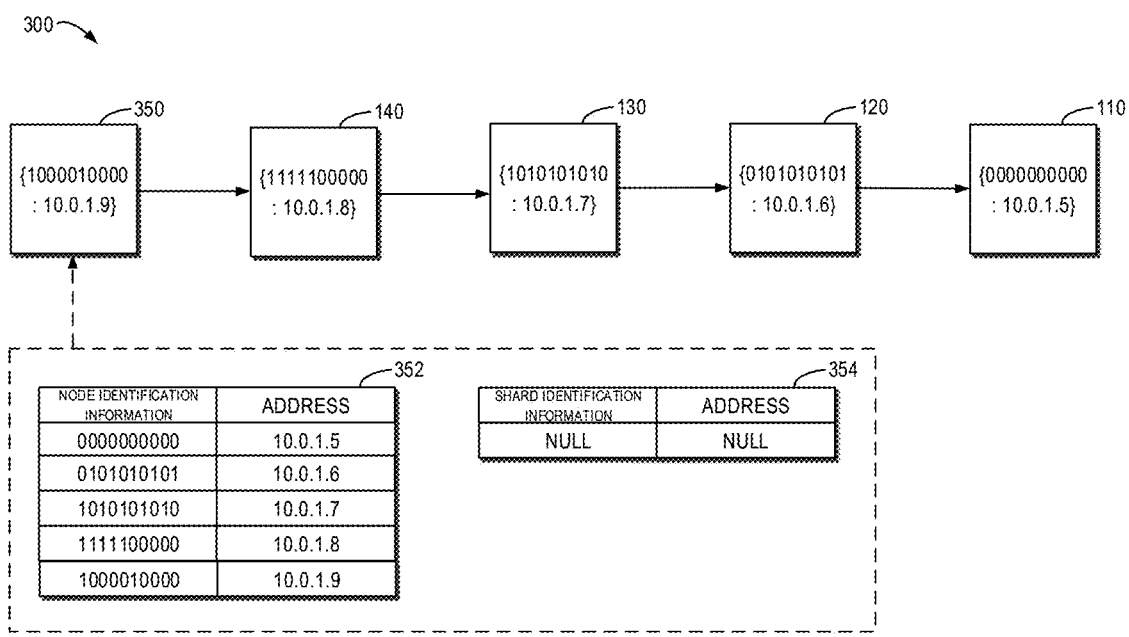
FIG. 3 is a schematic diagram illustrating a node registration process according to embodiments of the present disclosure.

In some embodiments, before the method 200 is performed, nodes may be registered on a blockchain. FIG. 3 is a schematic diagram 300 illustrating a node registration process according to embodiments of the present disclosure. The node registration process will be described below with the node 350 being an example. However, it would be appreciated that the registration process is also applicable to other nodes in the metadata management system 100.

As shown in FIG. 3, the node 350 may first create locally a shard address database 354. Then, the node 350 creates a new record on the blockchain. As aforementioned, a record in the blockchain database may be a key-value pair, where the key may be identification information of a node (for example, hash identification information of a node), and the value may be an address of the node (for example, an IP address of the node). In the case, for the new record created by the node 350 on the blockchain, the key is the identification information "1000010000" of the node 350, and the value is the address "10.0.1.9" of the node 350, as shown in the blockchain database 352 in FIG. 3. After creating the record about the node 350 on the blockchain, the node 350 is visible to other nodes in the metadata management system 100. It is because, once consensus is reached, blockchain databases of respective nodes in the metadata management system 100 contain the same record and have the same blockchain view correspondingly.

In some embodiments, a node may be unregistered from the blockchain. Since the blockchain is immutable, the node unregistration process is completed by creating a new record on the blockchain, simply stating that the current node is not available any more. For example, when the node 350 is unregistered, a new record may be created on the blockchain, where the key is the identification information "1000010000" of the node 350, and the value is a value indicating that the node is not available any more (for example, "NA").

It should be noted that unregistration is not required, but preferred, when a node leaves the network normally. However, as a node may fail due to software and hardware problems, any node in the system should not assume that a certain node registered on the blockchain is available. Consequently, all nodes in the network should have their own process to check activeness of the other nodes.

Returning to FIG. 2, after registration, at block 210, identification information of a shard of metadata is obtained at a node (also referred to as "first node" herein) of the blockchain-based metadata management system 100. In some embodiments, the first node may obtain a shard, and generate identification information of the shard by performing hash for the obtained shard. It would be appreciated that identification information of a shard may be generated using any method capable of mapping the shard uniquely, rather than hash only.

At block 220, the first node determines, based on similarities of identification information of the shard and identification information of candidate nodes of the metadata management system 100, a further node (also referred to as "second node" herein) for positioning the shard. It would be appreciated that, since the same identification information is obtained after performing hash for the shard and its replica, the shard and its replica may be positioned at the same second node.

In some embodiments, determining the second node may include determining an address of the second node. The identification information of the second node and the address of the second node have a predetermined correspondence relation. For example, the identification information of the second node and the address of the second node may be stored associatively as a record in a shard address database of the first node. Therefore, the first node may determine, by determining a record to which the identification information of the second node belongs, the address of the second node contained in the record.

In some embodiments, the similarity may be expressed using an edit distance between identification information of a candidate node and identification information of a shard. The edit distance may be, for example, but not limited to, Hamming distance, Levinstein distance, or the like. The first node may obtain identification information of one of the candidate nodes, and determine an edit distance between the identification information of the candidate node and the identification information of the shard. As a result, the first node may determine the candidate node as the second node in accordance with a determination that the edit distance exceeds a predetermined threshold. More particularly, the first node may determine the address of the candidate node as the address of the second node in accordance with a determination that the edit distance exceeds a predetermined threshold.

For example, it is assumed that the identification information of the shard that can be obtained by the first node 110 is "1111101010". The first node 110 may obtain identification information of candidate nodes 110-140, and compute edit distances between obtained identification information of the nodes and the identification information of the shard. Since the edit distance between the identification information of the second node 140 and the identification information of the shard is the smallest, the first node 110 may determine a second node (more particularly, an address of the second node 140) corresponding to the identification information of the second nodes 140.

For clarity, only one second node is taken as an example herein, but as a matter of fact, a plurality of second nodes may be determined for positioning a shard. Moreover, it is noted that the second node is a node for positioning a shard, but not necessarily a node actually storing the shard. In some cases, the second node may store a shard.

Then, at 230, the first node enables the second node to process identification information of the shard, so as to manage storage of the shard in the metadata management system 100. For example, such processing may be divided into a publishing process, a removing processing and a retrieving process. Hereinafter, the publishing process, the removing processing and the retrieving process will be described with reference to FIGS. 4-6.

Figure 4:
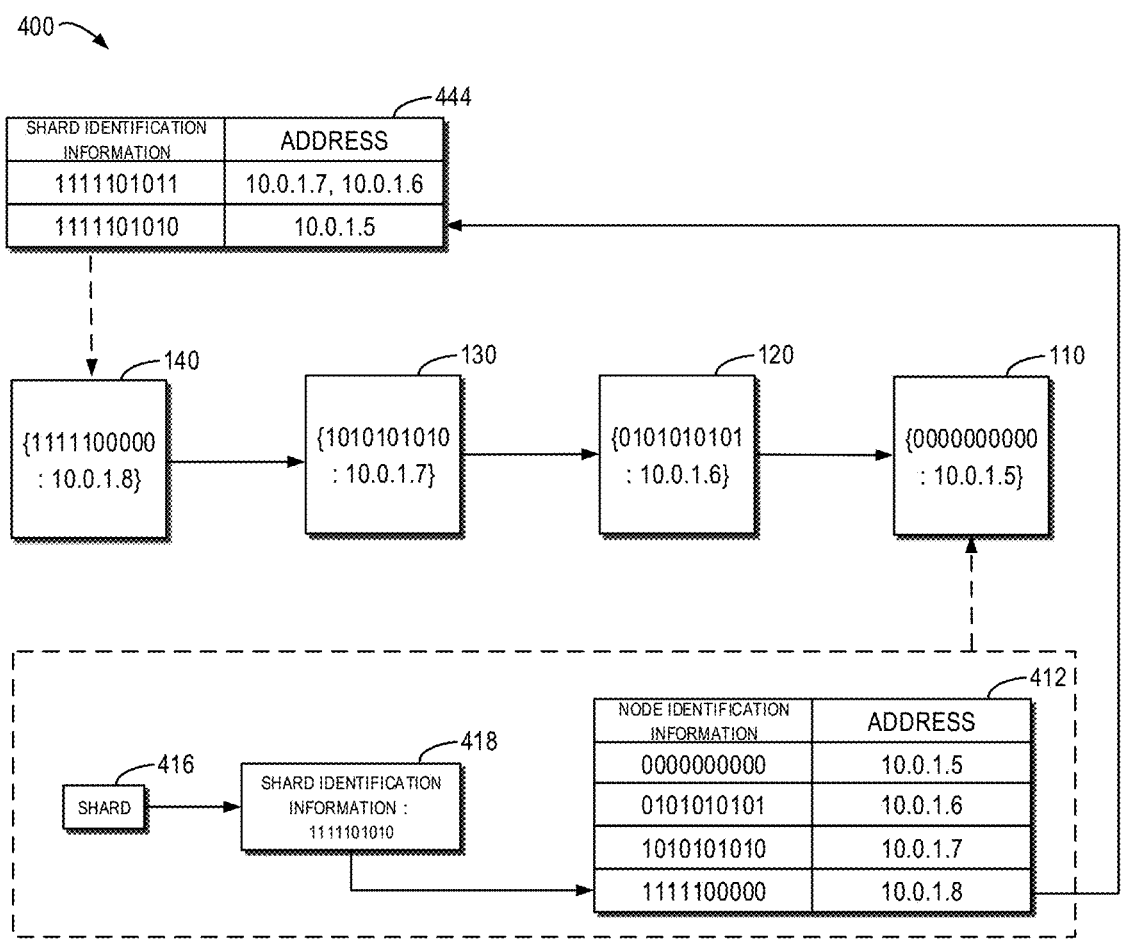
FIG. 4 is a schematic diagram illustrating a publishing process according to embodiments of the present disclosure.

FIG. 4 is a schematic diagram 400 illustrating a publishing process according to embodiments of the present disclosure. In the publishing process, the first node 110 may store a shard 416 and publish the shard 416 into the metadata management system 100. As aforementioned, the first node 110 has obtained identification information 418 "1111101010" of the shard 416 by hashing the shard 416 and its replica, and has determined the second node 140 (more specifically, an address "10.0.1.8" of the second node 140), based on the similarity of the identification information 418 "1111101010" of the shard 416 and the identification information "1111100000" of the second node 140 in the shard address database 412.

Then, the first node 110 obtains its address "10.0.1.5" and causes the second node 140 to store associatively the identification information 418 "1111101010" and the address "10.0.1.5" of the first node 110. For example, the first node 110 may be connected to the second node 140 using the address "10.0.1.8" of the second node 140, and transmit, to the second node 140, a creating request including the identification information 418 "1111101010" of the shard 416 and the address "10.0.1.5" of the shard 416, such that the second node 140 can store the received identification information 418 "1111101010" of the shard 416 and the address "10.0.1.5" of the first node 110 into a shard address database 444 of the second node 140, as a record, thereby completing the publishing process of the shard 416.

In this way, positioning information for positioning the actual storage position of the shard 416, i.e., the identification information 418 "1111101010" of the shard 416 and the address "10.0.1.5" of the first node 110, is stored into the second node 140. As such, in the subsequent shard positioning, the second node 140 storing the positioning information may be first found using the identification information of the shard, then an address of the first node 110 actually storing the shard may be obtained from the second node 140, and the shard thus can be obtained, based on the address, from the first node 110 storing the shard.

Figure 5:
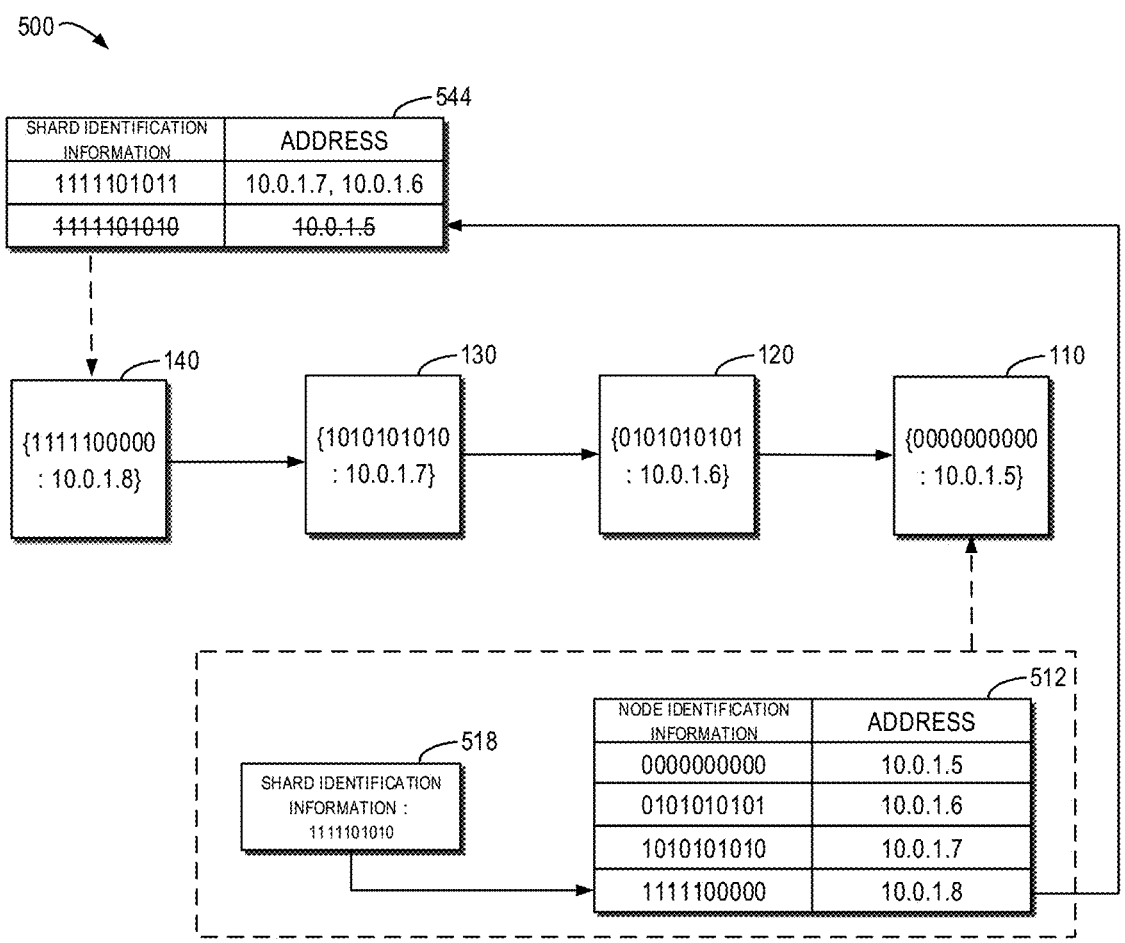
FIG. 5 is a schematic diagram illustrating a removing process according to embodiments of the present disclosure.

FIG. 5 is a schematic diagram 500 illustrating a removing process according to embodiments of the present disclosure. In the removing process, the first node 110 has determined the address "10.0.1.8" of the second node 140, based on the similarity of the identification information 518 "1111101010" of the shard and the identification information "1111100000" of the second node 140 in the shard address database 512.

Thereafter, the first node 110 may cause, based on the address "10.0.1.8" of the second node 140 and the identification information 518 "1111101010" of the shard, the second node 140 to remove the identification information 518 of the shard and the address "10.0.1.5" of the first node 110 stored in association with the identification information 518 of the shard. For example, the first node 110 may be connected to the second node 140 using the address "10.0.1.8" of the second node 140, and transmit, to the second node 140, a removing request including the identification information 518 "1111101010" of the shard, such that the second node 140 can remove the record containing the identification information 518 "1111101010" of the shard from its shard address database 544.

In some embodiments, the shard may have a plurality of replicas stored on different nodes. For example, as shown in FIG. 5, the shard with the identification information "1111101011" and its replicas are stored at nodes 130 and 120 with addresses "10.0.1.7" and "10.0.1.6", respectively. In the case, it is assumed that the first node is the node 120 and transmits, to the determined second node 140, a removing request including the identification information "1111101011" of the shard, the second node 140 will not remove the record containing the identification information "1111101011" of the shard from its shard address database 544, but only remove the address "10.0.1.6" of the first node from the record. This is because that the node 130 still stores the shard.

In this way, the second node storing positioning information may be found using the identification information of the shard, and the address of the node from which the shard can no longer be obtained may be removed from the second node.

Figure 6:
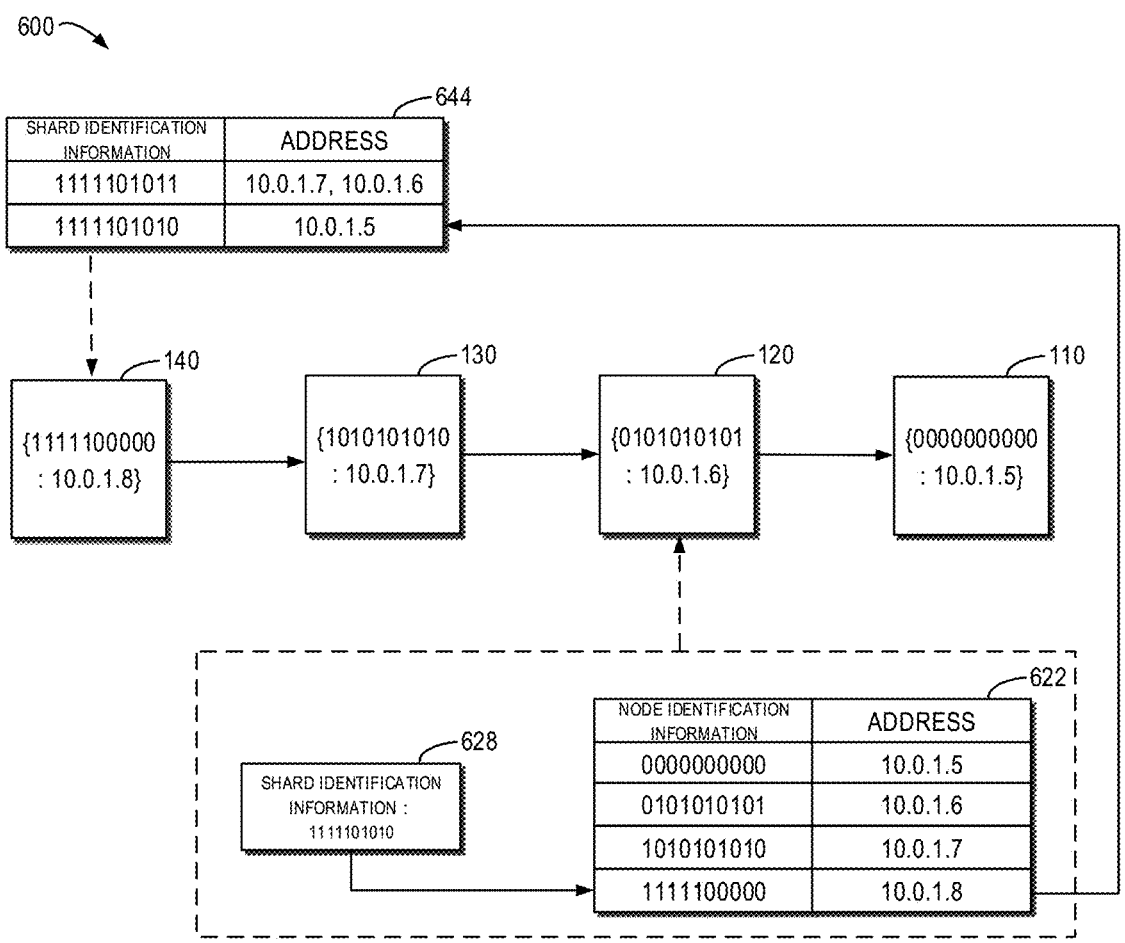
FIG. 6 is a schematic diagram illustrating a retrieving process according to embodiments of the present disclosure.

FIG. 6 is a schematic diagram 600 illustrating a retrieving process according to embodiments of the present disclosure. In the retrieving process, the first node 120 has determined the address "10.0.1.8" of the second node 140, based on the similarity of identification information 628 "111101010" of the shard and the identification information "1111100000" of the second node 140.

Then, the first node 120 may obtain, based on the address "10.0.1.8" of the second node 140 and the identification information 628 "1111101010" of the shard, an address "10.0.1.5" of a third node 110 stored in association with the identification information 628 "1111101010" of the shard, wherein the shard is stored in the third node 110. For example, the first node 120 may be connected to the second node 140 using the address "10.0.1.8" of the second node 140, and transmit, to the second node, a retrieving request including the identification information 628 "1111101010" of the shard. The second node 140 retrieves and returns the address "10.0.1.5" of the third node 110 storing the shard to the first node 120, in accordance with a determination that the retrieving request is received. Subsequently, the first node 120 may connect to the third node 110 using the address "10.0.1.5" of the third node 110, and obtain the shard based on the identification information 628 "1111101010" of the shard from the third node 110.

In this way, a second node storing positioning information may be first found using identification information of a shard, then an address of a node actually storing the shard may be obtained from the second node, and the shard thus may be obtained from the node storing the shard based on the address.

Figure 7:
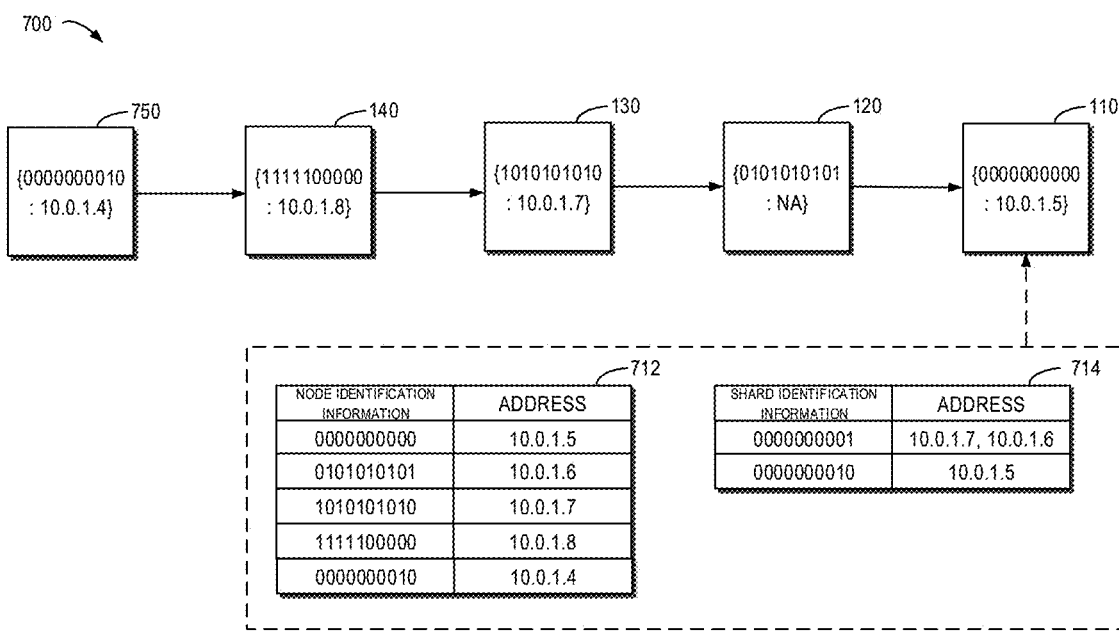
FIG. 7 is a schematic diagram illustrating a node maintenance process according to embodiments of the present disclosure.

In addition, because nodes join and leave the network constantly, the nodes with greatest similarity found in the shard publishing process may not always be the optimum nodes. In the case, the active nodes should periodically maintain records stored locally in their shard address database. FIG. 7 is a schematic diagram 700 illustrating a node maintenance process according to embodiments of the present disclosure.

In some embodiments, a node periodically check its shard address database and blockchain database, to ensure that positioning information for positioning a node actually storing the shard is stored at a node identified by identification information of the node having greatest similarity to the identification information of the shard. As shown in FIG. 7, the first node 110 may periodically check a shard address data base 714 and a blockchain database 712, and find that identification information "0000000010" of a newly registered node 750 in the blockchain is closer to the identification information "00000000010" of the shard. In the case, the first node 110 removes the record corresponding to the identification information "0000000010" of the shard from the shard address database 714, and causes the record to be stored in the shard address database of the node 750.

In addition, for a much longer period (for example, 8 hours), the node may check all records in its shard address database. For each record, the node may ask a node indicated in the record to confirm whether the indicated node is still active and stores the shard. Otherwise, the node may remove the record or the address of the node indicated in the record.

For example, it is assumed that the shard address database of the first node stores associatively the identification information of the shard and an address of a further node (also referred to as "fourth node" herein) of the metadata management system 100 storing the shard. The first node may transmit, to the fourth node, a request for confirming whether the fourth node is active and stores the shard. After receiving, from the fourth node, a reply that the fourth node is inactive or does not store the shard, the first node may remove, from its shard address database, the identification information of the shard and the address of the fourth node.

Figure 8:
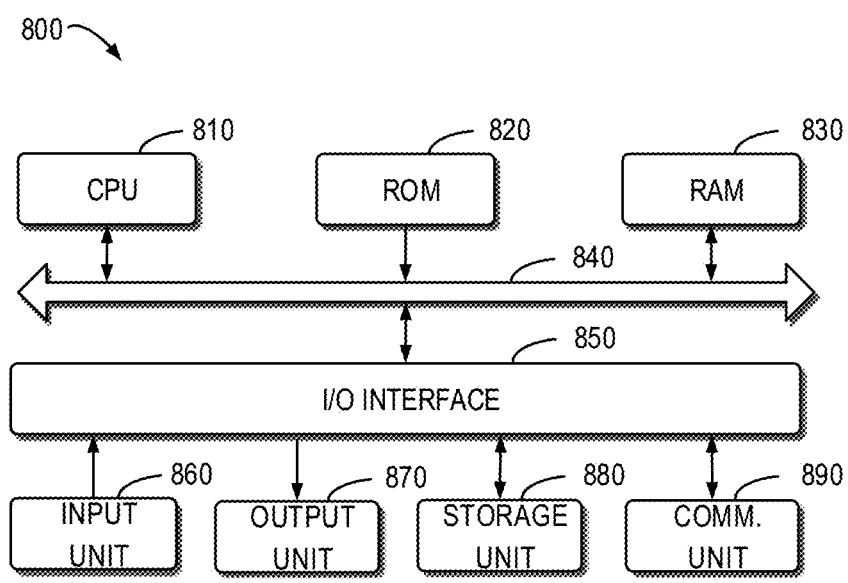
FIG. 8 is a schematic block diagram illustrating an example device that may be used to implement embodiments of the present disclosure.

FIG. 8 illustrates a block diagram of an example device 800 that may be used to implement embodiments of the present disclosure. For example, the node as shown in FIG. 1 may be implemented by the device 800. As shown, the device 800 includes a central processing unit (CPU) 810 which performs various appropriate acts and processing, based on a computer program instruction stored in a read-only memory (ROM) 820 or a computer program instruction loaded from a storage unit 880 to a random access memory (RAM) 830. The RAM 830 stores therein various programs and data required for operations of the device 800. The CPU 810, the ROM 820 and the RAM 830 are connected via a bus 840 with one another. An input/output (I/O) interface 850 is also connected to the bus 840.

The following components in the device 800 are connected to the I/O interface 850: an input unit 860 such as a keyboard, a mouse and the like; an output unit 870 including various kinds of displays and a loudspeaker, etc.; a storage unit 880 including a magnetic disk, an optical disk, and etc.; a communication unit 890 including a network card, a modem, and a wireless communication transceiver, etc. The communication unit 890 allows the device 800 to exchange information/data with other devices through a computer network such as the Internet and/or various kinds of telecommunications networks.

Various processes and processing described above, e.g., the method 200, may be executed by the processing unit 810. For example, in some embodiments, the method 200 may be implemented as a computer software program that is tangibly included in a machine readable medium, e.g., the storage unit 880. In some embodiments, part or all of the computer programs may be loaded and/or mounted onto the device 800 via ROM 820 and/or communication unit 890. When the computer program is loaded to the RAM 830 and executed by the CPU 810, one or more steps of the method 200 as described above may be performed.

The present disclosure may be a method, device, system, and/or computer program product. The computer program product may include a computer readable storage medium having computer readable program instructions thereon for carrying out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card and/or network interface in each computing/processing device receive computer readable program instructions from the network and forward the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of information processing, comprising:
   obtaining identification information of a shard of metadata at a first node of a blockchain-based metadata management system;
   determining, based on similarities of the identification information of the shard and identification information of candidate nodes of the metadata management system, a second node for positioning the shard from the candidate nodes, wherein the second node is of the blockchain-based metadata management system and includes a respective blockchain database; and
   enabling the second node to process the identification information of the shard, to manage storage of the shard in the metadata management system by storing an actual storage position of the shard and the identification information of the shard as a key-value pair in a shard address database of the second node, wherein the identification information of the shard comprises a key of the key-value pair and the actual storage position of the shard comprises a value of the key-value pair.

2. The method of claim 1, wherein obtaining the identification information of the shard comprises:
   obtaining the shard; and
   generating the identification information of the shard by hashing the shard.

3. The method of claim 1, wherein determining the second node comprises:
   obtaining identification information of a candidate node of the candidate nodes;
   determining an edit distance between the identification information of the candidate node and the identification information of the shard; and
   determining the candidate node as the second node in accordance with a determination that the edit distance exceeds a predetermined threshold.

4. The method of claim 1, wherein determining the second node comprises:
   determining an address of the second node, the address of the second node and the identification information of the second node have a correspondence.

5. The method of claim 1, wherein enabling the second node to process the identification information of the shard comprises:

sending a creating request including an address of the first node to the second node, to enable the second node to store the identification information of the shard in association with the address of the first node.

6. The method of claim 1, wherein enabling the second node to process the identification information of the shard comprises:
sending a removing request including the identification information of the shard to the second node, to enable the second node to remove the identification information of the shard and the address of the first node stored in association with the identification information of the shard.

7. The method of claim 1, wherein the shard is stored in a third node of the metadata management system, and enabling the second node to process the identification information of the shard comprises:
sending a retrieving request including the identification information of the shard to the second node, to enable the second node to retrieve a third node storing the shard.

8. The method of claim 7, further comprising:
obtaining, from the second node, an address of the third node stored in association with the identification information of the shard; or
obtaining the shard based on the identification information of the shard from the third node.

9. The method of claim 1, wherein the first node stores identification information of a further shard in association with an address of a fourth node of the metadata management system storing the further shard, and the method further comprises:
transmitting, to the fourth node, a request for confirming whether the fourth node is active and stores the further shard; and
in accordance with a determination that a reply that the fourth node is inactive or does not store the further shard is received from the fourth node, removing at least the address of the fourth node.

10. A device for information processing, comprising:
at least one processing unit; and
at least one memory coupled to the at least one processing unit and storing instructions executed by the at least one processing unit, the instructions, when executed by the at least one processing unit, causing the device to perform operations comprising:
obtaining identification information of a shard of metadata at a first node of a blockchain-based metadata management system;
determining, based on similarities of the identification information of the shard and identification information of candidate nodes of the metadata management system, a second node for positioning the shard from the candidate nodes, wherein the second node is of the blockchain-based metadata management system and includes a respective blockchain database; and
enabling the second node to process the identification information of the shard, to manage storage of the shard in the metadata management system by storing an actual storage position of the shard and the identification information of the shard as a key-value pair in a shard address database of the second node, wherein the identification information of the shard comprises a key of the key-value pair and the actual storage position of the shard comprises a value of the key-value pair.

11. The device of claim 10, wherein obtaining the identification information of the shard comprises:
obtaining the shard; and
generating the identification information of the shard by hashing the shard.

12. The device of claim 10, wherein determining the second node comprises:
obtaining identification information of a candidate node of the candidate nodes;
determining an edit distance between the identification information of the candidate node and the identification information of the shard; and
determining the candidate node as the second node in accordance with a determination that the edit distance exceeds a predetermined threshold.

13. The device of claim 10, wherein determining the second node comprises:
determining an address of the second node, the address of the second node and the identification information of the second node have a correspondence.

14. The device of claim 10, wherein enabling the second node to process the identification information of the shard comprises:
sending a creating request including an address of the first node to the second node, to enable the second node to store the identification information of the shard in association with the address of the first node.

15. The device of claim 10, wherein enabling the second node to process the identification information of the shard comprises:
sending a removing request including the identification information of the shard to the second node, to enable the second node to remove the identification information of the shard and the address of the first node stored in association with the identification information of the shard.

16. The device of claim 10, wherein the shard is stored in a third node of the metadata management system, and enabling the second node to process the identification information of the shard comprises:
sending a retrieving request including the identification information of the shard to the second node, to enable the second node to retrieve a third node storing the shard.

17. The device of claim 16, wherein the operations further comprise at least one of:
obtaining, from the second node, an address of the third node stored in association with the identification information of the shard; or
obtaining the shard based on the identification information of the shard from the third node.

18. The device of claim 10, wherein the first node stores identification information of a further shard in association with an address of a fourth node of the metadata management system storing the further shard, and the operations further comprises:
transmitting, to the fourth node, a request for confirming whether the fourth node is active and stores the further shard; and
in accordance with a determination that a reply that the fourth node is inactive or does not store the further shard is received from the fourth node, removing at least the address of the fourth node.

19. A computer program product, tangibly stored on a non-transient computer readable medium and comprising machine executable instructions which, when executed, cause a machine to perform operations, the operations comprising:

obtaining identification information of a shard of metadata at a first node of a blockchain-based metadata management system;

determining, based on similarities of the identification information of the shard and identification information of candidate nodes of the metadata management system, a second node for positioning the shard from the candidate nodes, wherein the second node is of the blockchain-based metadata management system and includes a respective blockchain database; and enabling the second node to process the identification information of the shard, to manage storage of the shard in the metadata management system by storing an actual storage position of the shard and the identification information of the shard as a key-value pair in a shard address database of the second node, wherein the identification information of the shard comprises a key of the key-value pair and the actual storage position of the shard comprises a value of the key-value pair.

20. The computer program product of claim 19, wherein obtaining the identification information of the shard comprises:

obtaining the shard; and generating the identification information of the shard by hashing the shard.

* * * * *